Jan. 9, 1951           A. D. GREEN           2,537,130
PROCESS OF RECOVERING AN ISOBUTYLENE COPOLYMER
Filed Aug. 24, 1946
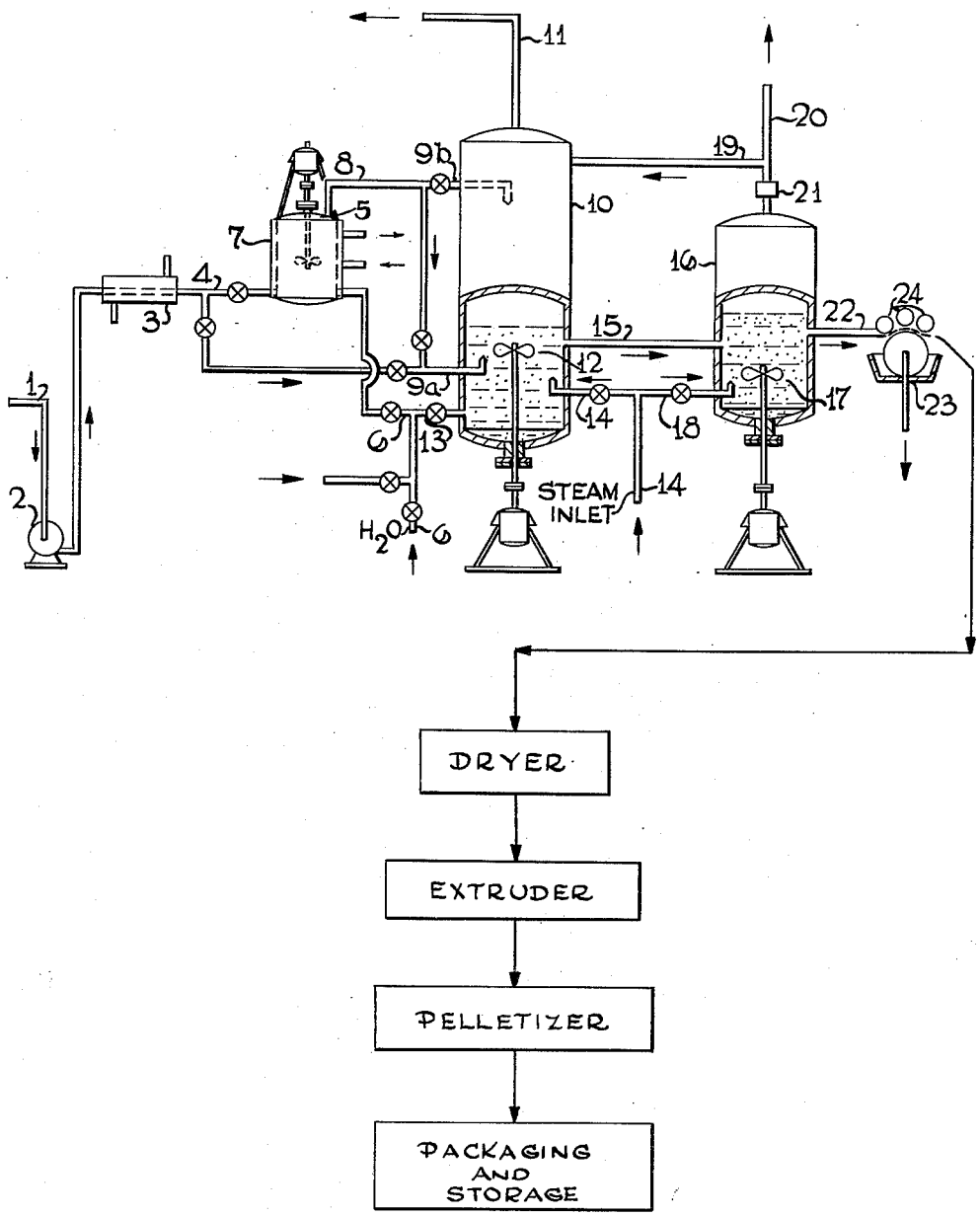
Arthur Donald Green     Inventor
By W. H. Smyers    Attorney

Patented Jan. 9, 1951

2,537,130

UNITED STATES PATENT OFFICE 2,537,130

PROCESS OF RECOVERING AN
ISOBUTYLENE COPOLYMER

Arthur Donald Green, Cranford, N. J., assignor to
Standard Oil Development Company, a corporation of Delaware Application August 24, 1946, Serial No. 692,607

3 Claims. (Cl. 260—88.1)

This invention relates to an improved process for finishing and recovering chemical polymerization products, particularly thermoplastic copolymers made at low temperature, i. e. below 0° C. by means of an acid-reacting catalyst such as a Friedel-Crafts catalyst. The invention is particularly applicable to the recovery of high molecular weight styrene-isobutylene type copolymers made for instance by polymerization at −90° C. in methyl chloride solvent, and using as catalyst a solution of aluminum chloride in methyl chloride.

The low temperature Friedel-Crafts polymerization technique has been successfully applied to the production of high molecular weight arylaliphatic copolymers, for instance styrene-isobutylene copolymers as described in Patent 2,274,749, and low-unsaturation tripolymers for instance made by using nearly equal parts of styrene and isobutylene and adding to that mixture a small amount such as 1 to 3% of isoprene.

Such low temperature polymerization processes can be carried out in a number of different ways, for instance with or without an inert solvent or diluent, which may be of the hydocarbon type such as liquefied propane or butane, or a lower alkyl halide such as ethyl chloride or methyl chloride. The catalyst may be added in gaseous form as in the case of boron fluoride, or in the form of a concentrated or dilute solution such as either aluminum chloride or boron fluoride dissolved in methyl or ethyl chloride. Refrigeration, which is necessary to remove heat liberated during the rapid polymerization, may be accomplished either externally by suitable cooling jackets or coils, or internally by the use of solid carbon dioxide or a liquefied auto-refrigerant such as ethylene. The reaction temperature to be used should normally be at least as low as −20° C. and is preferably below −50° C., and may conveniently be about −78° C. as obtained by using solidified $CO_2$ as refrigerant, or −103° C. as obtained by using liquefied ethylene as refrigerant, although it may be even lower by use of vacuum ethylene refrigeration or liquefied methane for either internal or external refrigeration.

The molecular weight of the resulting polymerization products may vary over a fairly wide range, for instance from 1,000 up to as high as 200,000, although more normally from 2,000 to 100,000, as determined by the Staudinger method, depending primarily upon the type and purity of reactants used and the temperature of copolymerization, and to a lesser extent upon other factors such as the type and amount of catalyst, per cent monomer conversion and the amount of diluent, etc. Generally, the higher molecular weights are obtained by using the lowest temperatures and purest reactants, i. e. freest of impurities such as certain oxygen and sulfur compounds which poison the catalyst. The higher molecular weights are also obtained by using a maximum proportion of isobutylene or other lower iso-olefin, because normal olefins and polymerizable materials containing a cyclic or aromatic nucleus, such as styrene, and diolefins such as butadiene and isoprene, or other polyenes, do not polymerize as rapidly or readily as isobutylene, and tend to produce lower molecular weight polymers. The softening temperature of these products varies with the molecular weight and combined styrene content.

Several difficulties are encountered in carrying out these low temperature polymerization processes. For instance, a batch polymerization proceeds very rapidly to high molecular weights at first, but as the amount of unreacted monomer becomes less the resulting batch polymerization products attain successively lower molecular weights, so that, particularly in the case of copolymers of two or more different reactants having different polymerization rates, if the reaction is driven to completion to 100% yield, i. e. 100% conversion of the monomers, the final polymerization products contain molecules having a very wide spread in molecular weight. Generally, the presence of the relatively low molecular weight molecules is undesirable and, therefore, it may be necessary for the process to be either adapted for removing low and intermediate molecular weight molecules from the desired high ones after such mixed products are formed, or else for stopping the polymerization in an earlier stage before undesirable proportions of lower molecular weight polymers have been formed. The latter procedure is generally preferred, but still presents the difficulty of separating unreacted monomers from the high molecular weight polymers. Another problem is the complete removal of residual catalyst, so that the recovered polymers may be used for coating paper, cloth, etc., or for wrapping foods and other products, without possibility of deterioration of the paper or cloth or contamination of the food by hydrolysis of residual catalyst in the polymer.

The purpose of the present invention is to provide an improved process for finishing and recovering the desired high molecular weight polymers free from unreacted monomers and catalyst.

Broadly, the invention is applicable to processes in which the polymerization products are obtained dispersed in an inert solvent or diluent, i. e. either completely or partially dissolved, or as a solvate suspension, and the invention comprises heating the crude polymer solution under pressure and then flashing it into hot water with rapid agitation, at or about atmospheric pressure, thereby forming a polymer-water slurry substantially free from volatile solvent and containing little or no unreacted monomers, and then if desired, subjecting this slurry to a further stripping by steam or other suitable stripping agent, at either atmospheric or reduced pressure, and then de-watering the polymer slurry by a suitable means such as a rotary filter, vibrating screen, etc., and finally drying the polymer. The process is preferably carried out by making a water emulsion or dispersion of the hot polymer solution while the latter is still under high pressure, so that when this polymer-solvent-water dispersion (referred to for simplicity as a pressure ternary dispersion) is flashed (preferably by mixing below the surface) into agitated hot water, the resultant polymer-water dispersion will contain finely divided particles, ranging from about ½ inch or so in diameter down to 100 mesh size and even smaller, with perhaps an average diameter size of about 10 mesh.

The preparation of this pressure ternary dispersion is a particularly advantageous feature of the invention, especially when applied to the recovery of polymers having a high intrinsic viscosity, e. g. above 0.5 as determined in toluene. Such dispersion is preferably accomplished by violently mixing the polymer-solvent solution with heated water, with or without a small amount of one or more dispersion-promoting additives, such as emulsifying, wetting, or dispersing agents, etc. The mixing may be accomplished directly by feeding one liquid into the other in pipes or by feeding both liquids into a suitable high speed centrifugal pump, or a turbo mixer or other special high speed mixing equipment such as the Lancaster disperser in which the materials to be mixed are brought into contact in a highly turbulent zone whereby efficient dispersion is obtained by means of the shearing action of rapidly moving parts alone or combined with the directioning effect of one or more small vanes or baffles. Other mixing equipment can be used such as a tube baffled to cause turbulent liquid flow, or a tower or tube packed with rings, spheres, or spirals, etc.

This pressure dispersion is preferably carried out with a short time of contact, i. e. preferably less than one minute, e. g. 30 seconds and preferably only 10 to 20 seconds or even less, so as to avoid hydrolysis of the alkyl halide solvent such as methyl chloride. The temperature to be used will depend upon the type of solvent and on the type of reacting monomers desired to be liberated upon subsequent flashing, but normally should be about 100 to 200° F. The superatmospheric pressure to be used should be sufficient to maintain the materials being mixed in the liquid state, and will likewise similarly depend upon the volatility of the solvent and the temperature, and normally will be within the range of about 100 to 500 pounds gauge, preferably about 150–300 lbs.

If dispersion promoters are used, suitable materials include dioctyl ester of succinic acid, sodium stearate, sodium hydroxide, etc., and these materials may be used in a concentration of about 0.02 to 0.10% by weight in the water.

The heating of the pressure ternary dispersion may be effected in various ways such as preheating either or both of the liquids before mixing or heating both as they are being mixed, or preheating one of the liquids such as the water to a temperature sufficiently to impart the desired final temperature to the mixture. However, the precaution should be observed that the solvent-polymer mixture should be first heated to a temperature above the hydrate formation point, for example above say 70° F. in the case of

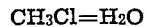

$$CH_3Cl = H_2O$$

The pressure dispersion prepared as just described, is then flashed down to atmospheric pressure, or thereabouts, e. g. a pressure of 0 to 15 lbs. gauge for example by discharging it above or beneath the liquid level in a vertical tower or flash tank, in which the resultant polymer-water slurry is vigorously agitated, preferably with a mechanical agitator, in order to maintain the polymer particles in small size while the volatile solvent such as methyl chloride or butane is liberated by the flashing, together with unreacted monomers such as isobutylene, styrene, isoprene, etc. Steam or other suitable inert stripping gas may be bubbled up through the slurry during this flashing, in order to assist in removing the less volatile constituents such as monomeric styrene. The pressure maintained in this flash zone is preferably atmospheric, but may be appreciably higher. The temperature maintained in the flash zone should also normally be within the range of 100 to 200° F., the same as in preparing the pressure dispersion, but may be either a little lower due to absorption of heat by release of pressure, or may be a little higher due to the heating action of steam used for stripping. The volatile gases and vapors discharged overhead from the flash zone are preferably condensed, cooled and recycled with or without any purification which might be required, such as for instance a preliminary scrubbing or partial condensation to remove any dimers or trimers which may have been formed during the polymerization and may have flashed overhead with the more volatile materials. It is possible and in some cases desirable to operate the flash zone under a pressure sufficiently high so that the flashed solvent and monomer can be condensed by cooling water without requiring compression.

Although for some purposes the polymer-water slurry which results may be sufficiently pure and free from unreacted monomer, it may be conveyed from the flash zone into one or more stripping zones, maintained at atmospheric pressure or preferably sub-atmospheric, e. g. at an absolute pressure of about 1 to 10 pounds. Steam or other inert gas may be used to assist in the stripping action, and the temperature may in general be the same as used in the flash zone. It is preferable to agitate the slurry mechanically in such stripping zones, in order to maintain the polymer particles in a well-dispersed condition so that they may continue to be handled as a liquid slurry rather than be permitted to coalesce or agglomerate into large masses. The resulting degassed polymer-water slurry is then dewatered by any suitable means such as filtering on a rotary vacuum filter, which may optionally be provided with one or more press rolls to assist in squeezing excess water out of the cake of polymer particles. Vibrating screens may also be used for filtering off the water from the polymer. (A "Louisville" filtering machine may also be used if desired.) In any case the dewatered polymer, now freed of the bulk of the water, will contain about 25 to 150 parts water per 100 parts of polymer, and is then ready for drying by various means such as passing on a belt or chain conveyor through a tunnel dryer, or on a hot drum dryer, or through a rotary dryer with hot gases fed either concurrently or countercurrently, and/or heating and flashing from a hot extruder with subsequent cooling with air or water spray and final air drying to remove surface moisture. The product is then ready for packaging in any desired form such as slabs, sheets, rolls, pellets, etc. for storage or shipment.

The polymers to which the invention may be applied include not only those specifically mentioned hereinbefore, but various other polymers using homologs or substituted derivatives of the materials previously mentioned. For instance, instead of isobutylene one may use other lower olefins, preferably iso-olefins such as 2-methyl butene-1 or propylene. Instead of styrene, one may use alpha methyl styrene, para methyl styrene, alpha methyl para methyl styrene, para chloro styrene, dichloro styrene, dihydronaphthalene, indene, or other olefinic polymerizable compound containing a cyclic, preferably aromatic nucleus. Instead of butadiene or isoprene as the diolefin, in case one is used in making tripolymers as described, others may be used as dimethyl butadiene, piperylene, methyl pentadiene, cyclopentadiene, etc. The amount of such diolefin to be used in the reacting liquid should generally not exceed 10%, based on the monoolefin, and should preferably be only about 0.1 to 10%, the best results being obtained with about 0.5 to 3% of the most active diolefins such as isoprene and cyclopentadiene. In the case of butadiene, a much larger proportion is usually desirable.

In the case of aryl-aliphatic copolymers such as styrene-isobutylene copolymers, which may contain from 1 to 95 or so per cent, preferably about 3 to 80%, of combined cyclic constituent, other things being equal, the molecular weight will vary inversely with the per cent of combined cyclic constituent up to about 70% thereof and then starts to increase, for instance being preferably about 15,000 to 40,000 Staudinger molecular weight for a styrene-isobutylene copolymer containing about 60% of combined styrene. In the case of cyclic-olefin-diolefin tripolymers, the molecular weight range is slightly lower than that for the cyclic-olefin copolymers just mentioned.

The invention will be better understood from a further consideration of the following detailed description illustrating the application of the invention to the recovery of a styrene-isobutylene copolymer having a combined styrene content of about 60%, and having an average Staudinger molecular weight of about 25,000 and an intrinsic viscosity of about 0.8 in toluene, this description being read in conjunction with the accompanying drawing which is a schematic layout of the process.

Referring to the drawing, the cold polymerization reaction solution being conveyed through line 1, may be explained as having the following approximate composition as it issues from the polymerization reactor at a temperature of about −100° F.:

| | Wt. per cent |
|---|---|
| Polymer | 18 |
| Isobutylene monomer | 1 |
| Styrene monomer | 5 |
| Methyl chloride (solvent) | 76 |
| Total | 100 |

This reactor solution is then forced by pump 2 through heater or exchanger 3 by means of line 4 into a pressure dispersion zone 5, here illustrated by an emulsifying tank equipped with a high speed agitator. Water is fed simultaneously through line 6 into the same pressure dispersion zone 5, which may, if desired, be provided with temperature adjusting jacket 7, e. g. a steam jacket or water jacket, for heating or cooling the mixture, and the resultant two-liquid-phase, highly dispersed mixture of polymer-solvent solution and water, containing about 60 to 90%, preferably about 80% of water, and having for instance a temperature of about 150° F. and pressure of about 250 pounds gauge, is continually discharged from the dispersing zone 5 through line 8 and thence through line 9a beneath the surface or 9b above the water level into flash tank 10, in which the pressure is reduced to about 5 pounds gauge, whereby substantially all of the methyl chloride solvent together with most of the volatile isobutylene and styrene monomers, are flashed out of the dispersed liquid mixture and withdrawn overhead through line 11 for condensing and either recovering the separate constituents or recycling the whole mixture after drying to the original polymerization zone not shown. The residual liquid in flash tank 10 is now essentially a slurry of about 1 to 5 wt. per cent desolventized polymer dispersed in water. This slurry is kept in a turbulent state by a suitable agitating means 12 (for example, a turbine type of agitator). As illustrated in the drawing, it is preferred that the polymer-solvent-water dispersion coming from line 9a be charged into flash tank 10 at a substantial distance below the level of the liquid slurry, so that the flashing of the solvent vapors will assist in stripping of the styrene monomer which may be present in the polymer-water slurry. If desired, some water may be withdrawn from line 6 through line 13 and also injected into the slurry in flash tank 10. Steam from a suitable line 14 may also be injected into the slurry in flash tank 10 in order to impart heat thereto in order to counteract the cooling effect of the flashing of the solvent vapors, and in fact it may be desirable to use enough steam to actually raise the temperature of the water-slurry for instance to about 200° F.

The resultant polymer-water slurry now substantially freed of methyl chloride solvent and possibly containing some isobutylene and styrene monomers, may be withdrawn continuously, as for instance by overflow or constant level device, from flash tank 10 through line 15 and fed into a stripping zone 16 illustrated in the drawing as a vertical drum in which the polymer-water slurry is maintained in a turbulent state by agitating means 17, and into which steam or other suitable stripping gas is fed from line 14 through line 18, in order to assist in stripping out any final residual traces of unreacted isobutylene and styrene monomers from the polymer-water slurry. This stripping zone 16 is preferably maintained at less than atmospheric pressure, as for instance about 3 pounds absolute pressure, and at a temperature of about 140° F., the steam and stripped vapors being withdrawn overhead from the stripping tank 16 through line 19, and may either be returned into the upper or vapor space of the flash tank 10 or may be wasted through line 20. A steam ejector 21 may be used to obtain or assist in obtaining the desired vacuum in the stripping zone 16. The water fed to line 6 is normally the water removed in the subsequent filtering operation.

The stripped polymer-water slurry may now be withdrawn from stripping zone 16 through line 22 and passed through filter 23 which may suitably be a vacuum rotary filter preferably provided with press rolls 24 to assist in squeezing water out of the sheet or cake of polymer particles as it goes over the rotary filter, and the resulting polymer cake having a moisture content of about 25 wt. per cent may then be further dried, extruded, pelletized, and packaged for storage or shipment, in equipment not shown in detail. Fresh wash water may be sprayed on the filter cake, if desired, from sprays 25.

It should be noted that any residual Friedel-Crafts catalyst which may have been present in the reactor solution coming through line 1, will be hydrolyzed in the pressure disperser 5, and from thence forward in the process will remain dissolved or suspended in the water phase of the slurry, until it is finally separated from the slurry in the filter 23 so that the final polymer product is substantially free from any residual catalyst.

It is not intended that this invention be limited to the specific materials and specific modifications of the invention which have been given merely for the sake of illustration, but only by the appended claims in which it is intended to claim all novelty inherent in the invention as well as all modifications coming within the scope and spirit of the invention.

I claim:

1. A process which comprises recovering a purified high molecular weight thermoplastic polymerization product selected from the group consisting of copolymers of an olefin of 3 to 5 carbon atoms with a polymerizable mono-olefinic compound containing an aromatic nucleus, and tripolymers of said two reactants with a minor proportion of a polyene of 4 to 10 carbon atoms, from a solution thereof in a volatile water-insoluble solvent, which comprises heating said polymer-solvent solution under pressure sufficient to maintain the materials in the liquid state, mixing the solution with water with rapid agitation while still under pressure, to make a warm polymer-solvent-water two-liquid phase dispersion, and flashing the latter into a flash zone maintained at a sufficiently lower pressure to cause flashing of the solvent vapors, and agitating the residual liquid mixture during such flashing whereby a polymer-water slurry is produced and maintained in good state of dispersion, and finally withdrawing slurry from said flash zone and separating the purified polymer from said slurry.

2. In the low temperature polymerization of 30 to 60% by weight of isobutylene with 40 to 70% by weight of styrene at a temperature below −50° C. in the presence of about 2 to 5 volumes of a volatile inert solvent, said inert solvent being selected from the group consisting of paraffin hydrocarbons having 3 to 4 carbon atoms and alkyl halides of 1 to 2 carbon atoms, and in the presence of a Friedel-Crafts catalyst, whereby after the polymerization reaction has been completed to the desired extent, a polymerization reaction mixture is obtained which comprises a major proportion of the volatile solvent having dissolved therein at least a major proportion of the thermoplastic copolymer of styrene and isobutylene having an average molecular weight of at least 15,000 by the Staudinger method, the improved process of recovering the high molecular weight copolymer in purified form from said reaction mixture which comprises mixing said solution with water with vigorous agitation under a pressure between about 100 and 500 lbs. gauge sufficient to maintain the materials in the liquid state, while imparting heat to said materials to make a resultant polymer-solvent-water dispersion having a temperature of about 100 to 200° F., and then flashing said dispersion down to a pressure of about 0 to 15 lbs. gauge while feeding it into an enlarged flash zone from which the solvent vapors together with minor amounts of polymerization feed monomers are flashed off and removed overhead from the flash zone, while the residual liquid consisting essentially of a water slurry of solid polymer particles having a size of about ½ inch down to 100 mesh, is vigorously agitated during the flashing and then withdrawn to a stripping zone where it is further agitated and stripped of any residual volatile materials, and finally filtered to remove the polymer from the bulk of the water.

3. The process which comprises recovering a purified styrene-isobutylene copolymer having a combined styrene content of about 60% and having an average Staudinger molecular weight of about 25,000 from a polymerization reaction mixture containing same in a proportion of about 18% by weight of polymer dissolved in about 75% by weight of methyl chloride, there also being present minor proportions of isobutylene and styrene monomers, said polymerization reaction mixture having a temperature of about −100° F., said recovery being effected by heating said polymer-solvent solution under pressure sufficient to maintain the materials in the liquid state, mixing the solution with water with a high speed agitator while still under pressure, to make a polymer-solvent-water dispersion in liquid phase having a temperature of about 150° F. and a pressure of about 250 lbs. gauge, flashing said dispersion by feeding it beneath the surface of the water level in a flash tank where the pressure is maintained at about 5 lbs. gauge, while agitating the residual liquid mixture during such flashing, whereby substantially all of the methyl chloride solvent together with most of the volatile isobutylene and styrene monomers are flashed out of the dispersed liquid mixture and withdrawn overhead, and whereby the resultant residual liquid is essentially a slurry of about 1 to 5 wt. per cent of desolventized styrene-isobutylene copolymer dispersed in water, and finally withdrawing slurry from said flash zone and filtering to remove the polymer from the bulk of the water.

ARTHUR DONALD GREEN.

REFERENCES CITED

The following references are of record in the file of this patent:

UNITED STATES PATENTS

| Number | Name | Date |
|---|---|---|
| 2,274,749 | Smyers | Mar. 3, 1942 |
| 2,401,754 | Green | June 11, 1946 |